US011713035B2

(12) United States Patent
Popuri et al.

(10) Patent No.: US 11,713,035 B2
(45) Date of Patent: Aug. 1, 2023

(54) SYSTEMS AND METHODS FOR LIMITING A DUTY CYCLE OF AN INTERNAL COMBUSTION ENGINE IN A SERIES HYBRID POWERTRAIN FOR IMPROVED TURBOCHARGER EFFICIENCY

(71) Applicant: CUMMINS INC., Columbus, IN (US)

(72) Inventors: Sriram S. Popuri, Greenwood, IN (US); Adrian P. Dale, Columbus, IN (US); Kristopher R. Bare, Columbus, IN (US); Xing Jin, Columbus, IN (US)

(73) Assignee: Cummins Inc., Columbus, IN (US)

( * ) Notice: Subject to any disclaimer, the term of this patent is extended or adjusted under 35 U.S.C. 154(b) by 395 days.

(21) Appl. No.: 17/009,326

(22) Filed: Sep. 1, 2020

(65) Prior Publication Data

US 2022/0063584 A1 Mar. 3, 2022

(51) Int. Cl.
*B60W 20/13* (2016.01)
*B60W 10/06* (2006.01)
*B60W 10/26* (2006.01)
*B60K 6/46* (2007.10)

(52) U.S. Cl.
CPC .............. *B60W 20/13* (2016.01); *B60K 6/46* (2013.01); *B60W 10/06* (2013.01); *B60W 10/26* (2013.01); *B60W 2400/00* (2013.01); *B60W 2510/0633* (2013.01); *B60W 2510/244* (2013.01)

(58) Field of Classification Search
None
See application file for complete search history.

(56) References Cited

U.S. PATENT DOCUMENTS

| 9,500,198 B2 | 11/2016 | Miazgowicz | |
|---|---|---|---|
| 10,208,693 B2 | 2/2019 | Xiao et al. | |
| 2008/0007205 A1* | 1/2008 | Thimm | F02N 11/0825 320/104 |
| 2009/0115358 A1* | 5/2009 | Kachi | B60L 15/2009 180/65.285 |
| 2018/0363572 A1* | 12/2018 | Glugla | B60K 6/48 |
| 2020/0180595 A1* | 6/2020 | King | F02D 41/065 |

FOREIGN PATENT DOCUMENTS

JP 2002-038962 2/2002

* cited by examiner

*Primary Examiner* — Todd Melton
*Assistant Examiner* — Jason R Roberson
(74) *Attorney, Agent, or Firm* — Foley & Lardner LLP

(57) ABSTRACT

A powertrain system includes an engine coupled to a turbocharger and a timer, a motor generator coupled to the engine and a battery, and a controller. The controller is structured to receive data indicative of a state of charge from the battery, determine whether the state of charge is at or below a high predefined threshold, modulate control on the engine and the timer in response to determining the state of charge is above the high predefined threshold, determine whether the state of charge is above a low predefined threshold in response to the state of charge being at or below the high predefined threshold, and modulate control of the engine and the timer in response to determining the state of charge is at or below the low predefined threshold.

21 Claims, 3 Drawing Sheets

SYSTEMS AND METHODS FOR LIMITING A DUTY CYCLE OF AN INTERNAL COMBUSTION ENGINE IN A SERIES HYBRID POWERTRAIN FOR IMPROVED TURBOCHARGER EFFICIENCY

TECHNICAL FIELD

The present disclosure relates to a turbocharger system of an internal combustion (IC) engine in a series hybrid powertrain.

BACKGROUND

Hybrid powertrain systems generally include both an electric motor and an internal combustion engine that are capable of powering the drivetrain in order to propel the vehicle. The typical duty cycles for conventional powertrains go through a wide range of the operating map such that the turbocharger inevitably goes through the entire range of its system efficiency. However, in a series architecture/configuration, the electric motor is operably connected to the drivetrain/transmission and the internal combustion engine indirectly powers the drivetrain/transmission by powering the electric motor; thus the operating map may be controlled.

SUMMARY

One embodiment relates to a powertrain system including an engine coupled to a turbocharger and a timer, a motor generator coupled to the engine and a battery, and a controller. The controller is structured to receive data indicative of a state of charge from the battery and determine whether the state of charge is at or below a high predefined threshold. The controller is structured to, in response to determining that the state of charge is above the high predefined threshold, modulate control of the engine and the timer. The controller is further structured to, in response to determining that the state of charge is at or below the high predefined threshold, determine whether the state of charge is above a low predefined threshold. The controller is further structured to, in response to determining that the state of charge is at or below the low predefined threshold, modulate control of the engine and the timer.

Another embodiment relates to a system including a controller. The control is structured to receive data indicative of a state of charge from a battery coupled to an engine and determine whether the state of charge is at or below a high predefined threshold. The controller is structured to, in response to determining that the state of charge is above the high predefined threshold, modulate control of the engine and a timer coupled to the engine. The controller is structured to, in response to determining that the state of charge is at or below the high predefined threshold, determine whether the state of charge is at above a low predefined threshold. The controller is structured to, in response to determining that the state of charge is at or below the low predefined threshold, modulate control of the engine and the timer in response to the determination of the state of charge.

Another embodiment relates to a method comprising receiving data indicative of a state of charge from a battery coupled to an engine and determining whether the state of charge is at or below a high predefined threshold. In response to determining that the state of charge is above the high predefined threshold, control of the engine and a timer coupled to the engine are modulated. In response to determining that the state of charge is at or below the high predefined threshold, it is determined whether the state of charge is above a low predefined threshold. In response to determining that the state of charge is at or below the low predefined threshold, control of the engine and the timer are modulated.

This summary is illustrative only and is not intended to be in any way limiting. Other aspects, features, and advantages of the devices or processes described herein will become apparent in the detailed description set forth herein, taken in conjunction with the accompanying figures, wherein like reference numerals refer to like elements.

DETAILED DESCRIPTION

Following below are more detailed descriptions of various concepts related to, and implementations of, methods, apparatuses, and systems to improve the efficiency of a turbocharger system based on a desired duty cycle in a hybrid vehicle. Before turning to the figures, which illustrate certain exemplary embodiments in detail, it should be understood that the present disclosure is not limited to the details or methodology set forth in the description or illustrated in the Figures. It should also be understood that the terminology used herein is for the purpose of description only and should not be regarded as limiting.

Referring to the Figures generally, systems and methods for optimizing a turbocharger system of an internal combustion engine in a series hybrid powertrain to operate at peak efficiency for a majority of the IC engine duty cycle is provided. A series hybrid powertrain system can be designed such that the IC engine duty cycle can be regulated sufficiently, which in turn enables the turbocharger to be developed to operate at its peak efficiency for much of the duty cycle.

The turbocharger on an IC engine typically has a range of efficiencies and usually reaches operation at its peak efficiency only for a narrow set of conditions on the engine's entire operating map. To have the turbocharger system operate at peak or near peak efficiencies for much of the duty cycle improves the open cycle effectiveness of the engine system, which in turns improves the brake thermal efficiency (BTE). In a series hybrid configuration, the IC engine operations are independent of the vehicle speed. Thus, coupled with reasonable adjustment of state of charge (SOC) thresholds (e.g., depleting and sustaining levels) to ensure the IC engine duty cycle is limited to a very small region of desired operating conditions, the turbocharger system can operate at peak efficiency while operating in that selected region of the operating map. With proper system design and controls, the vast majority of the duty cycle can be limited to this desired zone. Getting the turbocharger to operate at its peak (or near peak) efficiency for much of the duty cycle, advantageously increases overall system efficiency and reduces running costs (e.g., fuel costs).

The disclosed control process utilized in a series hybrid architecture uses a flexible SOC window of operation to limit the engine operating map to expected best efficiency of turbocharger through actual design and development of base turbocharger. Based on this control, the turbocharger design may be tailored to the specific application to exploit the trade-off between a reduced range of operation and a better component aerodynamic performance.

Figure 1:
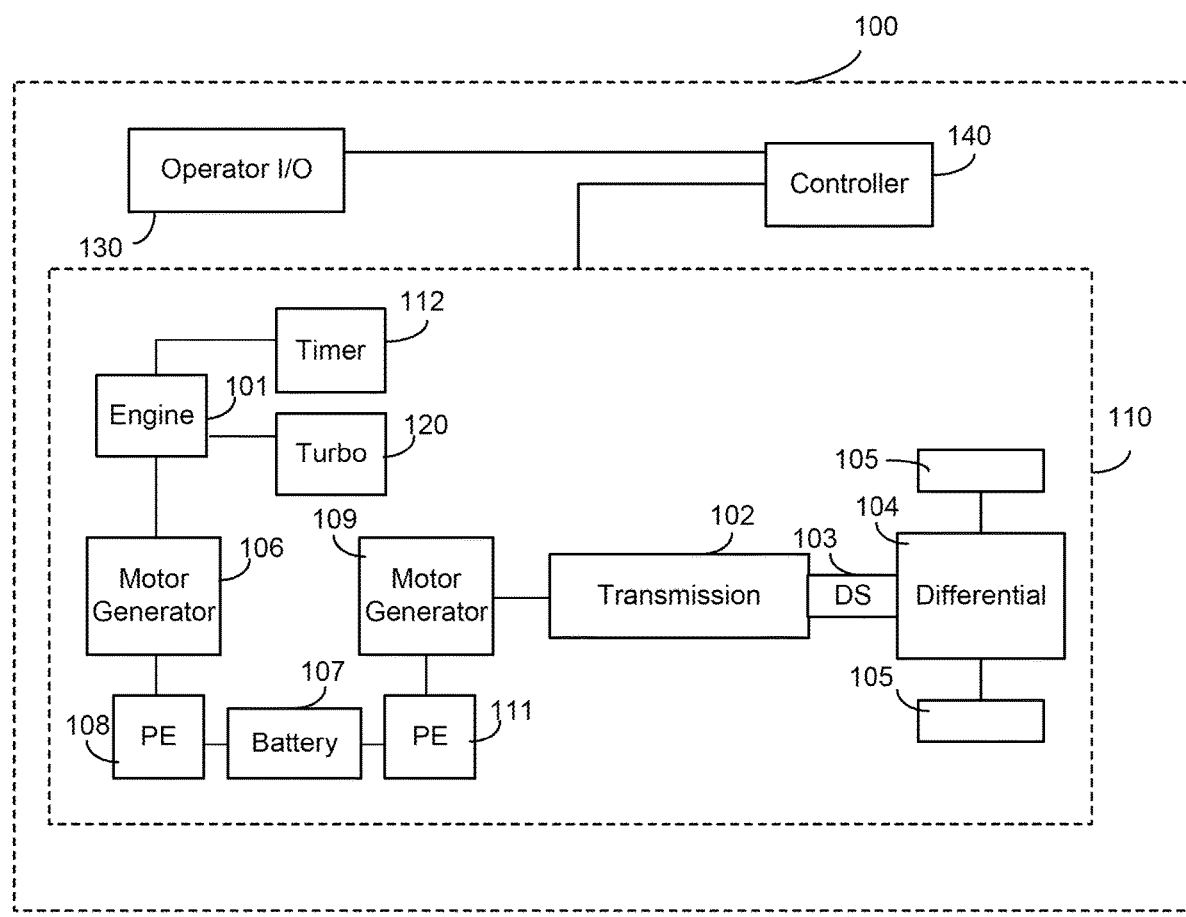
FIG. 1 is a schematic view of a block diagram of a vehicle, according to an example embodiment.

Referring now to FIG. 1, a vehicle 100 is shown to generally include a powertrain system 110, a turbocharger 120, an operator input/output (I/O) device 130, and a controller 140, where the controller 140 is communicably coupled to each of the aforementioned components.

The powertrain system 110 facilitates power transfer from an engine 101 and/or motor generator 106 to power and/or propel the vehicle 100. The powertrain system 110 includes the engine 101 and the motor generator 106 operably coupled to a transmission 102. The powertrain system may further include a clutch or a torque converter configured to transfer the rotating power from the engine 101 and/or the motor generator 106 to the transmission 102. The transmission 102 is operatively coupled to a drive shaft 103, which is operatively coupled to a differential 104, where the differential 104 transfers power output from the engine 101 and/or motor generator 106 to the final drive (shown as wheels 105) to propel the vehicle 100. In this regard, the powertrain system 110 is structured as an electrified powertrain. As a brief overview, the engine 101 receives a chemical energy input (e.g., a fuel such as gasoline or diesel) and combusts the fuel to generate mechanical energy, in the form of a rotating crankshaft. The engine 101 coupled to a motor generator 106 coupled to power electronics 108 supplies power to a battery 107. In comparison, a motor generator 109 may be in a power receiving relationship with an energy source, such as the battery 107 that provides an input energy (and stores generated electrical energy) via power electronics 111 to the motor generator 109 for the motor generator 109 to output in form of usable work or energy to in some instances propel the vehicle 100 alone or in combination with the engine 101.

In the configuration of FIG. 1, the hybrid vehicle 100 has a hybrid series drive configuration, such that the engine 101 can operate independently from the speed/load conditions at the final drive 105 (e.g., vehicle speed). Because of its independent operation, the engine 101 can be in operation for long continuous periods of time in a narrow band of speed/torque that is overall BTE optimal. This includes peak, or near peak, open cycle efficiency, such that the turbocharger 120 also can be expected to operate at near peak system efficiency. However, it should be understood that other configurations of the vehicle 100 are intended to fall within the spirit and scope of the present disclosure (e.g., a parallel configuration, series-parallel, etc.). For example, in a parallel configuration both the electric motor and the engine 101 are operably connected to the drivetrain/transmission to propel the vehicle simultaneously. Further, in a series-parallel configuration, the engine 101 and the electric motor can provide power independently or simultaneously. In the series-parallel configuration, the powertrain system may include a clutch positioned between the two motor generators (e.g., between the motor generator 106 and the motor generator 109 in the embodiment illustrated in FIG. 1). Additionally, a clutch may be positioned between the engine 101 and the motor generator 106 of FIG. 1.

The engine 101 may be structured as any internal combustion engine (e.g., compression-ignition or spark-ignition), such that it can be powered by any fuel type (e.g., diesel, ethanol, gasoline, etc.). The engine 101 includes one or more cylinders and associated pistons. Air from the atmosphere is combined with fuel, and combusted, to power the engine 101. Combustion of the fuel and air in the compression chambers of the engine 101 produces exhaust gas that is operatively vented to an exhaust pipe. Further, the engine 101 is coupled to the turbocharger 120. The turbocharger 120 includes a compressor wheel coupled to an exhaust gas turbine wheel via a connector shaft. Generally, hot exhaust gasses spin the turbine which rotates the shaft and in turn, the compressor, which draws air in. By compressing the air, more air can enter the cylinders, or combustion chamber, thus burning more fuel and increasing power and efficiency. The turbocharger 120 may include a heat exchanger to cool the compressed air before the air enters the cylinders.

Although referred to as a "motor generator" 106 throughout the disclosure, thus implying its ability to operate as both a motor and a generator, it is contemplated that the motor generator component, in some embodiments, may be an electric generator separate from the electric motor of the hybrid vehicle 100. The motor generator 106 may include a torque assist feature, a regenerative braking energy capture ability, a power generation ability, and any other feature of motor generators used in hybrid vehicles. In this regard, the motor generator 106 may be any conventional motor generator that is capable of generating electricity to produce a power output and drive the transmission 102. The motor generator 106 may include power conditioning devices such as an inverter and motor controller, where the motor controller may be operationally and communicably coupled to the controller 140.

The battery 107 may be configured as any type of rechargeable (i.e., primary) battery and of any size. That is to say, the battery 107 may be structured as any type of electrical energy storing and providing device, such as one or more capacitors (e.g., ultra capacitors, etc.) and/or one or more batteries typically used or that may be used in hybrid vehicles (e.g., Lithium-ion batteries, Nickel-Metal Hydride batteries, Lead-acid batteries, etc.). The battery 107 may be operatively and communicably coupled to the controller 140 to provide data indicative of one or more operating conditions or traits of the battery 107. The data may include a temperature of the battery, a current into or out of the battery, a number of charge-discharge cycles, a battery voltage, etc. As such, the battery 107 may include one or more sensors coupled to the battery 107 that acquire such data. In this regard, the sensors may include, but are not limited to, voltage sensors, current sensors, temperature sensors, etc.

The vehicle 100 may further include a timer 112. The timer 112 may be configured to keep the engine 101 running as long as permissible before shutting off. This continuous length of operation will enable the engine 101 to operate in a tight band of the engine map window and enable the turbocharger to operate at its maximum efficiency, as described herein. For instance, when the engine 101 starts, the timer starts along with it, and the timer 112 continues to run until the engine 101 turns OFF and the timer 112 resets for the next cycle. Further, the timer 112 defines a charging path or a discharging path of the SOC; if the timer 112 is ON when the SOC is in between the window limits, the process will continue charging (e.g., the charging path). If the timer 112 is found to be OFF when the SOC is in in between the window limits, the process continues to check until a given event, such as the SOC coming down to the lower limit (e.g., the discharging path). The timer 112 is configured to count the engine ON operation while charging. Thus, the timer 112 is tied into keeping the SOC flexible until it reaches the upper limit, wherein the engine 101 shuts off.

Referring still to FIG. 1, an operator input/output (I/O) device 130 is also shown. The operator I/O device 130 may be communicably coupled to the controller 140, such that information may be exchanged between the controller 140 and the I/O device 130, wherein the information may relate to one or more components of FIG. 1 or determinations (described below) of the controller 140. The operator I/O device 130 enables an operator of the vehicle 100 to communicate with the controller 140 and one or more components of the vehicle 100 of FIG. 1. For example, the operator input/output device 130 may include, but is not limited to, an interactive display, a touchscreen device, one or more buttons and switches, voice command receivers, etc.

The controller 140 is structured to control the operation of the vehicle 100 and associated sub-systems, such as the powertrain system 110, the turbocharger 120, and the operator input/output (I/O) device 130. Communication between and among the components may be via any number of wired or wireless connections. For example, a wired connection may include a serial cable, a fiber optic cable, a CAT5 cable, or any other form of wired connection. In comparison, a wireless connection may include the Internet, Wi-Fi, cellular, radio, etc. In one embodiment, a controller area network (CAN) bus provides the exchange of signals, information, and/or data. The CAN bus includes any number of wired and wireless connections. Because the controller 140 is communicably coupled to the systems and components of FIG. 1, the controller 140 is structured to receive data from one or more of the components shown in FIG. 1. The structure and function of the controller 140 is further described in regard to FIG. 2.

Figure 2:
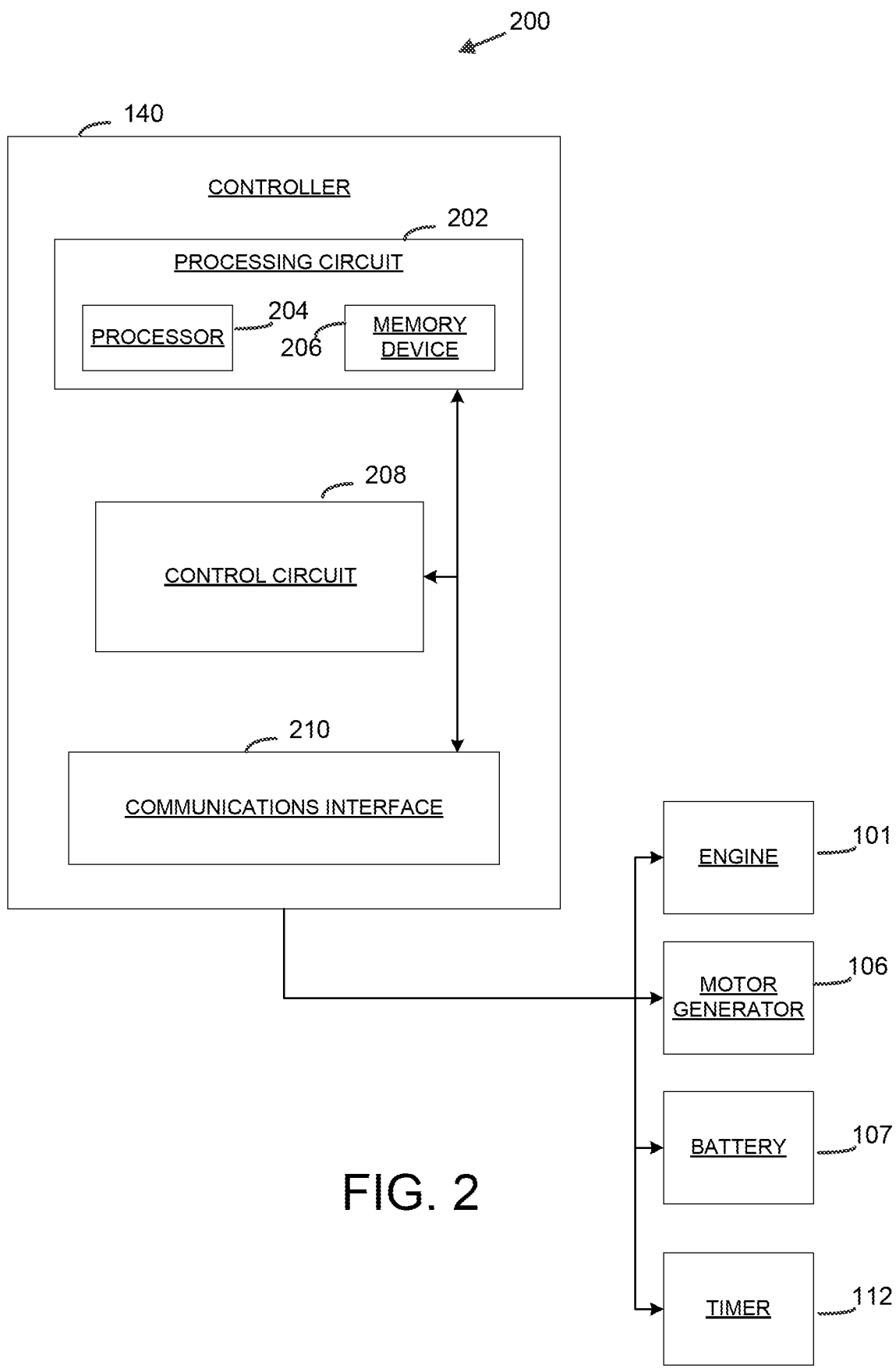
FIG. 2 is a block diagram of an example controller for use with the vehicle of FIG. 1.

Referring now to FIG. 2, a schematic diagram 200 of the controller 140 of the vehicle 100 of FIG. 1 is shown according to an example embodiment. The controller 140 may be structured as one or more electronic control units (ECU). The controller 140 may be separate from or included with at least one of a transmission control unit, a powertrain control module, an engine control module, etc. In one embodiment, the components of the controller 140 are combined into a single unit. In another embodiment, one or more of the components may be geographically dispersed throughout the system. All such variations are intended to fall within the scope of the disclosure. The controller 140 is shown to include a processing circuit 202 having a processor 204 and a memory device 206, a control circuit 208, and a communications interface 210.

In one configuration, the control circuit 208 is embodied as machine or computer-readable media that is executable by a processor, such as processor 204. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control circuit 208 is embodied as a hardware unit, such as an electronic control unit. As such, the control circuit 208 may be embodied as one or more circuitry components including, but not limited to, processing circuitry, network interfaces, peripheral devices, input devices, output devices, sensors, etc. In some embodiments, the control circuit 208 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control circuit 208 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control circuit 208 may also include programmable hardware devices such as field programmable gate arrays, programmable array logic, programmable logic devices or the like. The control circuit 208 may include one or more memory devices for storing instructions that are executable by the processor(s) of the control circuit 208. The one or more memory devices and processor(s) may have the same definition as provided below with respect to the memory device 206 and processor 204. In some hardware unit configurations and as described above, the control circuit 208 may be geographically dispersed throughout separate locations in the system. Alternatively and as shown, the control circuit 208 may be embodied in or within a single unit/housing, which is shown as the controller 140.

In the example shown, the controller 140 includes the processing circuit 202 having the processor 204 and the memory device 206. The processing circuit 202 may be structured or configured to execute or implement the instructions, commands, and/or control processes described herein with respect to the control circuit 208. The depicted configuration represents the control circuit 208 as machine or computer-readable media. However, as mentioned above, this illustration is not meant to be limiting as the present disclosure contemplates other embodiments where the control circuit 208 is configured as a hardware unit. All such combinations and variations are intended to fall within the scope of the present disclosure.

The processor 204 may be implemented as one or more general-purpose processor, an application specific integrated circuit (ASIC), one or more field programmable gate arrays (FPGAs), a digital signal processor (DSP), a group of processing components, or other suitable electronic processing components. In some embodiments, the one or more processors may be shared by multiple circuits (e.g., the control circuit 208 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 206 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 206 may be communicably connected to the processor 204 to provide computer code or instructions to the processor 204 for executing at least some of the processes described herein. Moreover, the memory device 206 may be or include tangible, non-transient volatile memory or non-volatile memory. Accordingly, the memory device 206 may include database components, object code components, script components, or any other type of information structure for supporting the various activities and information structures described herein.

The communications interface 210 may include any combination of wired and/or wireless interfaces (e.g., jacks, antennas, transmitters, receivers, transceivers, wire terminals) for conducting data communications with various systems, devices, or networks structured to enable in-vehicle communications (e.g., between and among the components of the vehicle) and out-of-vehicle communications (e.g., with a remote server). For example and regarding out-of-vehicle/system communications, the communications interface 210 may include an Ethernet card and port for sending and receiving data via an Ethernet-based communications network and/or a Wi-Fi transceiver for communicating via a wireless communications network. The communications interface 210 may be structured to communicate via local area networks or wide area networks (e.g., the Internet) and may use a variety of communications protocols (e.g., IP, LON, Bluetooth, ZigBee, radio, cellular, near field communication).

The communications interface 210 may facilitate communication between and among the controller 140 and one or more components of the vehicle 100 (e.g., the engine 101, the transmission 102, the turbocharger 120, etc.). Communication between and among the controller 140 and the components of the vehicle 100 may be via any number of wired or wireless connections (e.g., any standard under IEEE). For example, a wired connection may include a serial cable, a fiber optic cable, a CAT5 cable, or any other form of wired connection. In comparison, a wireless connection may include the Internet, Wi-Fi, cellular, Bluetooth, ZigBee, radio, etc. In one embodiment, a controller area network (CAN) bus provides the exchange of signals, information, and/or data. The CAN bus can include any number of wired and wireless connections that provide the exchange of signals, information, and/or data. The CAN bus may include a local area network (LAN), or a wide area network (WAN), or the connection may be made to an external computer (for example, through the Internet using an Internet Service Provider).

The control circuit 208 is configured to communicate with and control the various components of the vehicle 100. Thus, a single controller may coordinate the engine operating point. The control circuit 208 is configured to communicate with the engine to modulate the engine in response to a charge sustaining level being at or below a predefined threshold. The control circuit 208 may also be structured to receive data indicative of the SOC from the battery 107.

Figure 3:
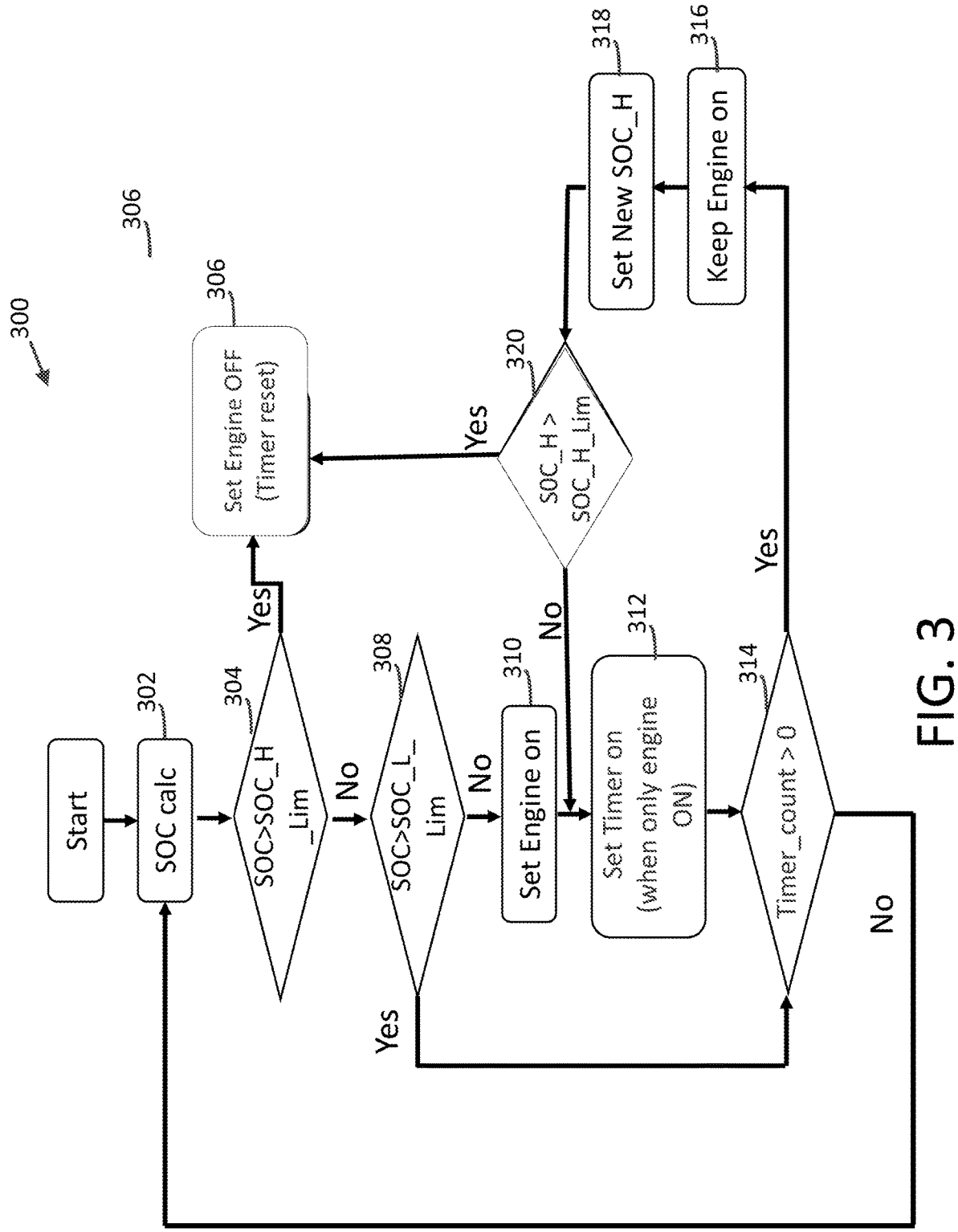
FIG. 3 is a flow diagram of a logic of controlling a duty cycle of the vehicle of FIG. 1, according to an example embodiment.

Referring now to FIG. 3, a logic 300 of running a hybrid system to attain a desired engine duty cycle is shown. The desired engine duty cycle allows the turbocharger 120 to operate at near constant speeds for a large portion of duty cycle, although the duty cycle is expected to have some transients due to ICE start/stop nature of the system operation. The duty cycle stability may depend on the SOC, such that SOC thresholds (e.g., charge deplete and charge sustaining modes) can be optimized in a way that the engine operates for reasonably long steady segments of time. As will be understood through the logic 300, the goal is to keep the engine 101 running (e.g., when it's ON), with the timer 112 counting to keep the engine 101 running as long as it can before shutting off (i.e., reaching the SOC max limit). This continuous length of operation will enable the engine 101 to operate in a tight band of the engine map window, in terms of its speed/load space. In turn, this enables the turbocharger to operate at its maximum efficiency as the turbocharger would have been optimally designed for that tight operating window, described herein. This tight engine map window may also be selected to operate at engine optimal efficiency thereby giving overall optimal engine system efficiency.

Engine ON/OFF of logic 300 is solely defined by the SOC window. For instance, the SOC lower limit may be 30% and the SOC higher limit may be 90%. When the SOC is discharging down from the higher limit to the lower limit, the engine OFF and ON timer will be running. When the SOC hits the lower limit, the engine starts and keeps operating until the SOC of the storage system (e.g., the battery) reaches the maximum limit. When the engine 101 starts, the timer 112 starts along with it, and the timer continues to run until the engine 101 turns OFF and the timer resets for the next cycle.

For example, an SOC at a given time, is found to be 60%, and thus, is on the discharging path. Essentially, the process with keep checking the SOC until the SOC reaches the lower limit (when it starts to charge the storage system, engine ON, timer ON, etc.). On the other hand, if the SOC is found to still be 60% at a given time, but is on the charging path, then the process will keep the engine 101 running and the timer 112 running until it reaches the higher limit of SOC (when engine turns OFF, timer OFF, timer resets, etc.). Whether the SOC is on a charging path or a discharging path is based on the engine status or timer status. If the timer 112 is ON when the SOC is in between the window limits, then it is on the charging path and the process will continue charging. If the timer 112 is found to be OFF when the SOC is in in between the window limits, then it is on the discharging path and the process continues to check until a given event, such as the SOC coming down to the lower limit.

Generally speaking, at 302, the process starts by calculating the SOC. As such, the process checks where the current SOC is for an energy storage system (e.g., the battery 107). At 304, if the SOC is greater than a high threshold (SOC_H_Lim), where SOC_H is the charge sustaining level (e.g., 90%), the engine 101 is turned off at 306. At 304, if the SOC is less than or equal to the high threshold, the process at 308 determines if the SOC is greater than a low threshold (SOC_L_Lim) (e.g., 30%). If the SOC is greater than the low threshold, the process moves to 314, wherein the process determines if the timer is on (ie., Time_count>0). If the timer is on, the process is on the charging path and will continue the engine 101 running, along with the timer running at 316. At 318, the charge is kept at new SOC_H. SOC_H is the dynamic SOC calculated while charging the energy storage system, as opposed to SOC as the initial SOC. At 320, the process checks if SOC_H is greater than SOC_H_Lim. If it is, the engine turns off and the timer is reset at 306. If SOC_H is not greater than SOC_H_Lim, the engine timer continues running and counting down at 312. Returning to 308, if the SOC is less than or equal to the lower threshold, the engine 101 is turned on at 310. At 312, the engine on timer is set on. At 314, the process determines if the timer is on, and if it is not, then the process in on the discharging path and loops through the logic, starting back at 302. The timer to count the engine ON operation while charging is tied into keeping the SOC flexible until it reaches the upper limit (SOC_H_Lim) whereby the engine shuts off. This logic keeps the SOC window wide enough to keep the engine 101 ON for longer periods of time and the SOC limit window flexible through the system's life. Leaving the engine 101 ON for longer periods will ensure the engine operates for as long as possible at the desired duty cycle to enable maximum engine system efficiency, particularly from the standpoint of the turbocharger.

In response to the near constant turbocharger speed duty cycle expected for this narrow range ICE duty cycle, the compressor wheel trim, sizing, and housing, for instance, may be altered to tune the compressor to operate at its peak efficiency. Unlike the compressor, where design for peak efficiency is possible, optimization is expected to be a little more constrained overall for the turbine. However, a decent high efficiency range is achievable by selecting the correct wheel, size, and housing to combine with the compressor that is designed to have peak efficiency.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A "coupled" to circuit B may signify that the circuit A communicates directly with circuit B (i.e., no intermediary) or communicates indirectly with circuit B (e.g., through one or more intermediaries).

While various circuits with particular functionality are shown in FIG. 2, it should be understood that the controller 140 may include any number of circuits for completing the functions described herein. For example, the activities and functionalities of the control circuit 208 may be combined in multiple circuits or as a single circuit. Additional circuits with additional functionality may also be included. Further, the controller 140 may further control other activity beyond the scope of the present disclosure.

As mentioned above and in one configuration, the "circuits" may be implemented in machine-readable medium for execution by various types of processors, such as the processor 204 of FIG. 2. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

Accordingly, the present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A powertrain system for a flexible state of charge window, the powertrain system comprising:
an engine coupled to a turbocharger and a timer configured to start a count in response to the engine turning on;
a motor generator coupled to the engine and a battery; and
a controller coupled to the engine and the timer, the controller structured to:
receive data indicative of a state of charge from the battery;
determine whether the state of charge is at or below a high predefined threshold;
in response to determining that the state of charge is above the high predefined threshold, modulate control of the engine and the timer;
in response to determining that the state of charge is at or below the high predefined threshold, determine whether the state of charge is above a low predefined threshold;
in response to determining that the state of charge is at or below the low predefined threshold;
turn on the engine and the timer; and
in response to determining a dynamic state of charge is less than or equal to the high predefined threshold and the count is not greater than zero, turn off the engine and reset the timer.

2. The system of claim 1, wherein the controller is further structured to turn the engine off and reset the timer in response to the state of charge being above the high predefined threshold.

3. The system of claim 1, wherein the controller is further structured to keep the engine on in response to the state of charge being at or below the low predefined threshold.

4. The system of claim 1, wherein the controller is further structured to determine if the timer is on in response to the state of charge being above the low predefined threshold.

5. The system of claim 4, wherein the controller is further structured to modulate control of the engine in response to the timer being on.

6. The system of claim 4, wherein the controller is further structured to determine whether the state of charge is at or below the high predefined threshold in response to the timer being off.

7. The system of claim 1, wherein the controller is further structured to determine a second dynamic state of charge in response to the dynamic state of state of charge being less than or equal to the high predefined threshold and the count being greater than zero.

8. The system of claim 7, wherein the controller is further structured to turn the engine off in response to the second dynamic state of charge being above the high predefined threshold.

9. The system of claim 1, wherein the engine, the motor generator, and the battery are in a series configuration.

10. A system for limiting a duty cycle of an engine, comprising:
a controller structured to:
receive data indicative of a state of charge from a battery coupled to the engine;
determine whether the state of charge is at or below a high predefined threshold; in response to determining that the state of charge is above the high predefined threshold, module control of the engine and a timer coupled to the engine, the timer configured to start a count in response to the engine turning on;
in response to determining that the state of charge is at or below the high predefined threshold, determine whether the state of charge is above a low predefined threshold; and
in response to determining that the state of charge is at or below the low predefined threshold;
turn on the engine and the timer; and
in response to determining a dynamic state of charge is less than or equal to the high predefined threshold and the count is not greater than zero, turn off the engine and reset the timer.

11. The system of claim 10, wherein the controller is further structured to turn the engine off and reset the timer in response to the state of charge being above the high predefined threshold.

12. The system of claim 10, wherein the controller is further structured to keep the engine on in response to the state of charge being at or below the low predefined threshold.

13. The system of claim 10, wherein the controller is further structured to determine if the timer is on in response to the state of charge being above the low predefined threshold.

14. The system of claim 13, wherein the controller is further structured to modulate control of the engine in response to the timer being on.

15. The system of claim 13, wherein the controller is further structured to determine whether the state of charge is at or below the high predefined threshold in response to the timer being off.

16. The system of claim 10, wherein the controller is further structured to determine a second dynamic state of charge in response to the dynamic state of charge being less than or equal to the high predefined threshold and the count being greater than zero.

17. The system of claim 16, wherein the controller is further structured to turn the engine off in response to the second dynamic state of charge being above the high predefined threshold.

18. A method, comprising:
receiving data indicative of a state of charge from a battery coupled to an engine;
determining whether the state of charge is at or below a high predefined threshold; in response to determining that the state of charge is above the high predefined threshold, modulating control of the engine and a timer coupled to the engine, the timer configured to start a count in response to the engine turning on;
in response to determining that the state of charge is at or below the high predefined threshold, determining whether the state of charge is above a low predefined threshold; and
in response to determining that the state of charge is at or below the low predefined threshold;
turning on the engine and the timer; and in response to determining a dynamic state of charge is less than or equal to the high predefined threshold and the count is not greater than zero, turn off the engine and reset the timer.

19. The method of claim 18, further comprising:
turning the engine off in response to the state of charge being above the high predefined threshold;
resetting the timer in response to the state of charge being above the high predefined threshold; and
keeping the engine on in response to the state of charge being at or below the low predefined threshold.

20. The method of claim 18, further comprising:
determining if the timer is on in response to the state of charge being above the low predefined threshold;
modulating control of the engine in response to the timer being on; and
determining whether the state of charge is at or below the high predefined threshold in response to the timer being off.

21. The system of claim 1, wherein the controller is further structured to:
calculate a dynamic state of charge while charging the battery; and
determine if the dynamic state of charge is greater than the high predefined threshold and if the count is greater than zero.

* * * * *